United States Patent [19]

Duling, III et al.

[11] Patent Number: 5,056,111
[45] Date of Patent: Oct. 8, 1991

[54] INTEGRATED TERAHERTZ ELECTROMAGNETIC WAVE SYSTEM

[75] Inventors: Irl N. Duling, III, Arlington, Va.; Daniel R. Grischkowsky, Peekskill, N.Y.; Jean-Marc Halbout, Larchmont, N.Y.; Mark B. Ketchen, Ossining, N.Y.

[73] Assignee: IBM Corporation, Armonk, N.Y.

[21] Appl. No.: 230,212

[22] Filed: Aug. 9, 1988

[51] Int. Cl.$^5$ .............................................. H04L 27/00
[52] U.S. Cl. .................................. 375/37; 350/96.14; 455/609
[58] Field of Search ...................... 332/163, 165, 185; 343/701; 455/106, 107, 124, 600, 609, 611, 620; 375/37, 41, 59, 68, 74, 121; 350/96.11, 96.13, 96.14, 96.16; 372/9; 250/336.1, 393, 370.01; 307/311

[56] References Cited

U.S. PATENT DOCUMENTS 4,482,863 11/1984 Auston ................................ 324/158 T

OTHER PUBLICATIONS

*Applied Physics Letters* 48(12), Mar. 24, 1986, "Generation of Subpicosecond Electrical Pulses on Coplanar Transmission Lines", pp. 751–753, Ketchen et al.

*Physical Review Letters*, vol. 53, No. 16, Oct. 14, 1984, pp. 1555–1558, Auston et al., "Cherenkov Radiation from Femtosecond Optical Pulses in Electro-Optic Media".

*Applied Physics Letters*, 43(8), Oct. 15, 1983, pp. 713–715, Auston et al, "Subpicosecond Electro-Optic Shock Waves".

Primary Examiner—Benedict V. Safourek
Attorney, Agent, or Firm—Sughrue, Mion, Zinn, Macpeak & Seas

[57] ABSTRACT

A communication system for transmitting and receiving terahertz signals has a emitter employing a resonant radiating structure connected to an ultrafast switch. The switch is a subpicosecond photoconducting switch coupled to a coplanar transmission line having a pair of approximately 1 micron wide Al lines deposited on an SOS substrate. The transmission line is separated from the tip of the radiating structure by a photoconducting gap forming the switch and is driven by a laser pulse. Utilizing the gap excitation principle, the transmitting antenna radiates a freely propagating signal that may be received by an identical structure either on the same or on different substrates.

20 Claims, 1 Drawing Sheet

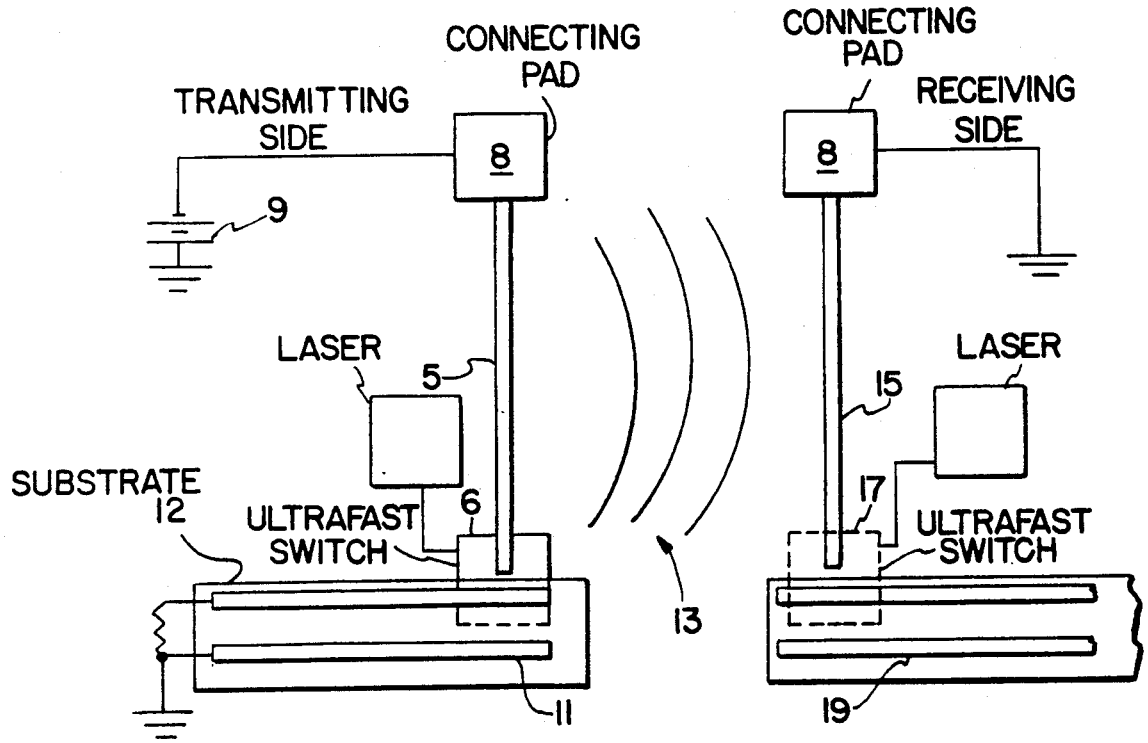
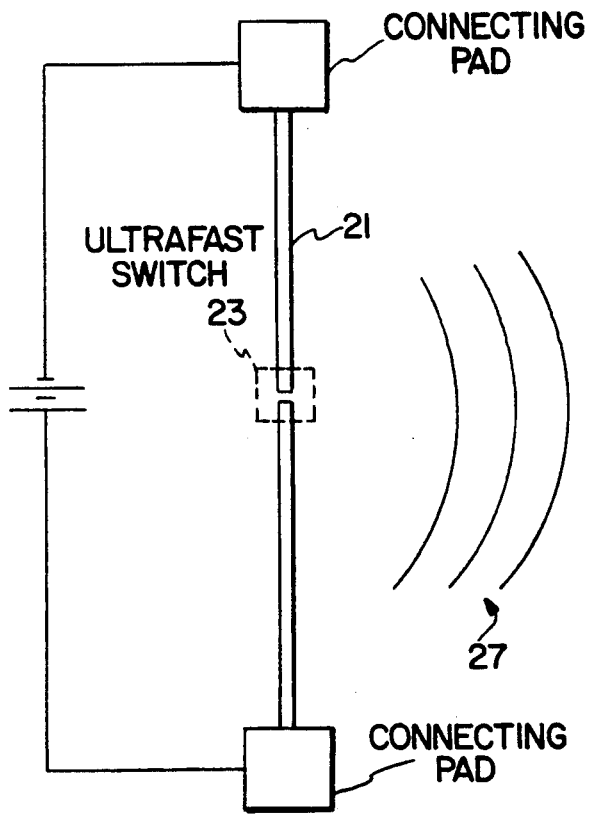

INTEGRATED TERAHERTZ ELECTROMAGNETIC WAVE SYSTEM

BACKGROUND OF THE INVENTION

1. Field Of The Invention

This invention relates to the generation of signals in the terahertz frequency range and the detection thereof.

2. Prior Art

An aspect of computer cycle speed is the time necessary for communication between logic circuitry and/or memory circuits. By increasing packing density and reducing the physical space between such elements, processing speeds may be increased by decreasing the signal path length. There are limits on packing density given problems of signal crosstalk, heating and the like. Thus other techniques for increasing system speed are needed once the option of increasing device packing density has been fully utilized. A corresponding requirement to attain higher processing speeds is the need for timing circuits which operate at very high frequencies yet provide stable clock pulses, uniformly distributed in time.

Early attempts to generate subpicosecond signals are reported in Auston, "Subpicosecond Electro-Optical Shock Waves", *Appl. Phys. Lett.* 43 (B) October 1983, pp. 713–715 and Auston et al. "Cherenkov Radiation from Femtosecond Optical Pulses in Electro-Optic Media", Phys. Rev. Lett. 53 1555, October 1984.

Reference is made to M. B. Ketchen, et al, "Generation of Subpicosecond Electrical Pulses on Coplaner Transmission Lines", *Appl. Phys. Lett.* 48(12), 24 March 1986, pp. 751–753. This publication describes techniques to generate ultrashort electrical pulses by photoconductively shorting charged transmission lines and narrow gaps. As reported in that article, a transmission line having a design impedance of 100Ω was made using three parallel 5-μm wide aluminum lines which were separated from each other by 10-μm. That transmission line together with its contact pads was fabricated on an undoped silicon on sapphire (SOS) wafer, which was subsequently ion implanted to shorten the carrier lifetime. The transmission line was photoconductively shorted utilizing 80 fs laser pulses. The exciting beam had a spot diameter of 10 μm which bridged two of the three parallel transmission lines in a "sliding contact" arrangement. By utilizing a sampling beam coupled to a multichannel analyzer, subpicosecond electrical pulses were measured having an actual pulse width less than 0.6 psec.

U.S. Pat. No. 4,251,130 defines a pulse generator using an optical gate to generate subpicosecond pulses. Pulses are created by having light pass back and forth between the facets of a waveguide in synchronism with a bias signal. The coupling characteristic is controlled along an optical direction coupler by the narrow band bias signal such that a zero coupling occurs only in the region about the zero points of the travelling bias signal.

U.S. Pat. No. 4,372,643 describes an ultrafast gate employing a transmission line with a standing wave set-up along it. The '643 patent employs a resonant electric signal circuit to generate large amplitude signals while consuming relatively little signal power.

While not prior art to this invention, DeFonzo et al in "Transient Response of Planar Integrated Optoelectronic Antennas", *Appl. Phys. Lett.* 50 April 1987, pp. 1155–1157 and "Optoelectric Transmission and Reception of Ultrashort Electrical Pulses", *Appl. Phys. Lett.* July 1987, pp. 212–214, reports the use of planar antenna structure fabricated on a radiation-damaged silicon-on-sapphire substrate for the detection of picosecond pulses.

Also, reference is made to Smith et al. "Subpicosecond Photoconducting Dipole Antennas" *IEEE J Quantum Elect.* 24, February 1988 No. 2, pp. 255–260 which, while not prior art to this invention. discusses the generation of subpicosecond electrical pulses, the use of small dipoles for transmission and coherent detection.

SUMMARY OF THE INVENTION

It is an object of this invention to define an integrated terahertz electrical wave system for generating and detecting freely propagating terahertz waves for use in communication systems.

It is a further object of this invention to provide a communication system capable of transmitting and receiving terahertz signals.

Yet another object of this invention is to define a standing wave oscillator capable of generating pulses at terahertz frequencies.

These and other objects of this invention are accomplished by the use of a pulse generator system operating in the ultrahigh frequency regime.

The emitter of this system consists of a resonant radiating structure connected to an ultrafast switch. The requirement on the speed of this switch is that the bandwidth corresponding to its turn-on time is greater than the characteristic frequency of the radiating structure, i.e. the switching speed is significantly faster than the period of the oscillation.

The fast switch is here composed of a subpsec. photoconducting switch connected to a coplanar transmission line. The transmission line has a pair of 1 micron wide aluminum lines separated by 2 microns. The lines are deposited on an ion implanted silicon-on-sapphire (SOS) substrate which is ideal for the photoconducting switch fabrication. The transmission line is separated from the tip of the radiating structure by the photoconducting gap which is typically 5 microns wide.

The photoconducting switch (gap) is driven by a laser pulse of subpsec. duration and with the sufficient energy to create a large transient population of carriers.

The radiating structure itself is a 1 micron wide aluminum line deposited on the same substrate. It will appreciated that this width may be varied depending on the application. Its length is adjusted to the desired period of oscillation. It has been demonstrated that a line 150 microns long yielded as expected radiation with a 5 psec oscillation period. The structure is end-fired by the photoconductive switch described above. The other end of the radiating structure is connected to a biasing network through a large high-frequency impedance discontinuity.

Utilizing the gap excitation principle, employing a transmitting antenna which radiates with its characteristic 5 psec oscillating period, a freely propagating signal may be observed utilizing a receiving antenna of identical design located at a remote point. Such is useful for on-chip signal propagation without the requirement of guiding structures. This matched pair then, allows for communication, intrachip or interchip (i.e.. chip to chip communication) for both logic and memory. This invention will be described in greater detail by referring the formal drawing and the description of the preferred embodiment that follow.

DESCRIPTION OF THE DRAWINGS

FIG. 1 is a schematic view of the essential structure used in accordance with this invention, and FIG. 2 is a schematic view of a modified transmitter used in the FIG. 1 embodiment.

DESCRIPTION OF THE PREFERRED EMBODIMENT

Referring now to FIG. 1 transmitting antenna and a receiving antenna in accordance with this invention is depicted. The transmitting antenna comprises a thin line 5 approximately 1 micron wide, and 0.5 micron thick and of a length equal to $\frac{1}{4}$ wavelength of the desired frequency of radiation. This line is terminated on one end by an ultrafast switching device 6 and on the other end by the large connecting pad 8. The electrical connection to this connecting pad will be understood by those of working skill and thus is not described herein in detail.

An example of the ultrafast switching device is the ultrafast photoconducting switch 6 connected to the coplanar transmission line 11 composed of two parallel metal lines fabricated on an insulating substrate 12. Typically, the design impedance for the line is approximately 100 ohms corresponding to a line separation twice that of the linewidth. Suitable lines can be made of 0.5 micron thick aluminum with linewidths from 1 micron to 10 microns. The metal pad 8 is connected to the bias source of voltage 9 for the operation of the ultrafast switch. It is reemphasized that the general requirement for the switch is that it should be fast compared to the period of oscillation of the antenna. For the case of this invention with the 150 micron long antenna fabricated on sapphire, the period is 5 psec. An operable switch which is used is the photoconductive gap as described in Auston (Supra.) and Ketchen et al (Supra.). Here, the switch is a simple 5 micron gap between the antenna and the transmission line. For operation of the switch, the metallurgy must be deposited on an ion-implanted SOS wafer as described in Ketchen et al.

Typically, the gap is biased at about 5 volts for operation, and it is shorted by an ultrashort laser pulse of subpsec duration. This transient excitation of the gap excites the tuned quarter wave antenna structure and an oscillation at this wavelength occurs. The antenna thereby radiates this characteristic wavelength radiation 13, which can propagate off-chip to other remote sites. The receiving antenna 15 is an identical structure to the transmitter 5, except for the absence of the bias voltage. Via the ultrafast switching device 17, the receiver is connected to the transmission line 19. This high bandwidth line leads to, for example, the logic and memory circuitry being activated and controlled by the received radiation. The transmission line 19 is similar to the transmission line 11, but does not need to be identical. Again, the requirement on the ultrafast switching device 17 is that it be faster than the period of the received radiation.

For the particular preferred embodiment, the photoconductive switch is employed, which also requires that the detector be also fabricated on an ion-implanted SOS wafer. This switch is a 5 micron photoconductive gap driven by a second synchronized focused subpsec laser pulse. Depending on the switching sequence positive or negative pulses can be generated on the transmission line corresponding to the time dependent voltage across the gap caused by the received radiation.

An alternative transmitter is shown in FIG. 2. This transmitter may be used in the FIG. 1 system. This design simply requires the antenna 21, now $\frac{1}{2}$ wavelength in total length, composed of two $\frac{1}{4}$ wavelength sections separated by an ultrafast switching device 23. Again, for the proposed embodiment we use a photoconductive gap for the ultrafast switch. This switch works in the same way as described above, and is driven with a subpsec laser pulse. The antenna radiates its characteristic radiation 27.

It will be apparent that modifications of this invention may be practiced without departing from the essential scope thereof.

Having described our invention, we claim:

1. A system for generating and transmitting terahertz frequency pulses comprising:
   means for producing laser pulses;
   an ultrafast switch responsive to laser pulses, said switch including a transmission line;
   a transmitting antenna connected to said ultrafast switch, said transmitting antenna positioned and spaced with respect to said transmission line to create an excitation gap between an end of said transmitting antenna and the transmission line, wherein said laser pulses excite said excitation gap to produce a periodic terahertz oscillation transmitted by said transmitting antenna.

2. The system of claim 1, wherein said transmitting antenna comprises a thin conductive material on an insulating substrate.

3. The system of claim 2, wherein said conductive material has a length of approximately 150 $\mu$m and said excitation gap is approximately 6 $\mu$m.

4. The system of claim 1 wherein said transmission line comprises a pair of separated lines, and said substrate is ion implanted silicon on sapphire material.

5. The system of claim 4, wherein said transmission lines are separated by 2 $\mu$m and each of said transmission lines comprises 1 $\mu$m wide aluminum.

6. The system of claim 1, wherein said means for producing laser pulses comprises a compensated, colliding pulse passively mode-locked dye laser.

7. The system of claim 6, wherein said laser source produces femtosecond output pulses at megahertz repetition rates.

8. The system of claim 7, wherein said output pulses are produced at 80 fs at a 100 MHz repetition rate.

9. The system of claim 1, further comprising a receiving antenna, said transmitting antenna and said receiving antenna each comprising a line having a length equal to $\frac{1}{4}$ wavelength of the desired frequency of said transmitted oscillation.

10. The system of claim 9, wherein said receiving antenna comprises a line approximately 1 micron wide.

11. A system for generating terahertz frequency pulses and detecting such at a remote position comprising:
   means for producing laser pulses;
   (A) a transmitter comprising;
      (1) an ultrafast switch responsive to laser pulses and having a first transmission line segment comprising a pair of thin conductive wires on a insulating substrate;
      (2) an antenna connected to said ultrafast switch, said antenna positioned and spaced with respect to said first transmission line with an excitation gap between an end of said antenna and said first transmission line, such that laser pulses excite said excitation gap to produce a periodic terahertz oscillation, and (B) a receiver comprising;
  (1) a second ultrafast switch having a transmission line segment comprising a pair of thin conductive wires on a insulating substrate;
  (2) a second antenna spaced from said second transmission line to create an excitation gap between an end of said antenna and said second transmission line and receiving circuitry response to inputs from said second antenna to sense said periodic terahertz oscillation transmitted.

12. The system of claim 11, wherein each of said transmission line segments are mounted on the same substrate.

13. The system of claim 11, wherein said first and second antennas are resonant emitters and/or receivers tuned by changes in their length.

14. The system of claim 11, wherein said antennas each comprise a line having a length equal to ¼ wavelength of the desired frequency of said transmitted oscillation.

15. The system of claim 11, wherein each of said transmission lines comprises a pair of separated lines, and said substrate is an ion implanted silicon on sapphire material.

16. The system of claim 15, wherein said transmission lines are separated by 2 $\mu$m and each of said transmission lines comprises 1 $\mu$m wide aluminum.

17. The system of claim 11, wherein said means for producing laser pulses comprises a compensated, colliding pulse passively mode-locked dye laser.

18. The system of claim 11, wherein said laser source produces femtosecond output pulses at magahertz repetition rates.

19. The system of claim 11, wherein said transmission line segments are mounted on different substrates.

20. The system of claim 11, wherein each of said antennas comprise a 1 $\mu$m wide line.

* * * * *